April 7, 1959 W. R. BROWN ET AL 2,880,596
NESTING PORTABLE FROZEN FOOD DISPLAY BOX
Filed May 28, 1956
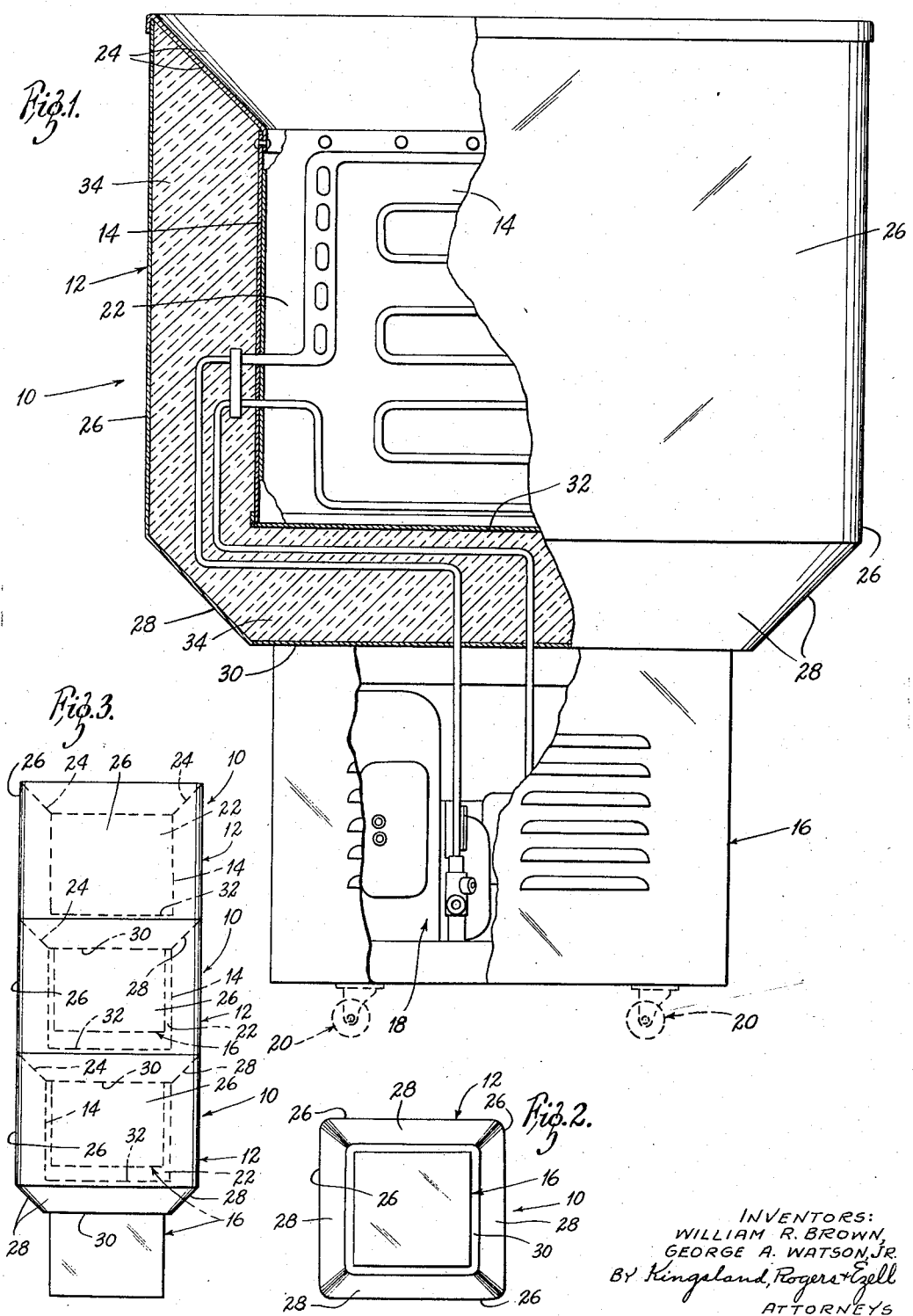
INVENTORS:
WILLIAM R. BROWN,
GEORGE A. WATSON, JR.
BY Kingsland, Rogers & Ezell
ATTORNEYS

United States Patent Office 2,880,596
Patented Apr. 7, 1959

2,880,596

NESTING PORTABLE FROZEN FOOD DISPLAY BOX

William R. Brown and George A. Watson, Jr., Athens, Ga.

Application May 28, 1956, Serial No. 587,630

5 Claims. (Cl. 62—246)

The present invention relates generally to frozen food cabinets, and more particularly to a nesting portable frozen food display box.

There are in use today various types of frozen food products cabinets from which the customer may select numerous items. Dairy products, such as ice cream, milk, and the like, frozen fish, frozen vegetables, and other refrigerated items are displayed in these refrigerator cabinets in self-service stores throughout the country. However, the frozen food industry has long needed a portable, light-weight, top-loading display freezer for the sale of special items which will occupy a minimum of space in storage and in transportation. Such an item has particularly long been needed in chain stores, which may highlight one or more items and require, from time to time, various numbers of display boxes.

Therefore, an object of the present invention is to provide a novel refrigerated display box which fulfills the long-sought requirements of a portable unit.

More specifically, another object of the present invention is to provide a novel refrigeration box for display of frozen foodstuffs, and the like, which is a light-weight, portable nesting unit reducing to a minimum the over-all space required for transportation and storage thereof.

In brief, the present novel unit includes an open frozen foodstuffs cabinet, the walls of which comprise the evaporator unit and the top wall of which slopes inwardly. The compressor and condenser unit is disposed in a closed frame beneath the footstuffs cabinet and is of a configuration to fit within the foodstuffs compartment or space for transportation and storage purposes, the base of the foodstuffs cabinet sloping at the same degree as the top wall thereof.

Another object of the present invention is to provide a novel refrigerated box which may be readily moved about a store and which may be readily transported between stores.

Another object is to provide a novel refrigerated box which adapts itself readily to the display of a single item, being of a size to be located at any convenient point in a store, provided there is an electric outlet.

Another object is to provide a novel refrigerated box which is relatively inexpensive, yet highly effective, so that a large number of units may be employed by a single or a chain of stores.

The foregoing and other objects and advantages are apparent from the following description taken with the accompanying drawing, in which:

Figure 1 is a side elevational view of a refrigerated box incorporating the principles of the present invention, parts being broken away and parts being in section to more particularly disclose elements of the box;

Figure 2 is a bottom plan view thereof on a reduced scale; and

Figure 3 is a side elevational view of three refrigerated boxes stacked one on the other, illustrating the nesting feature of the novel box.

Referring to the drawing more particularly by reference numerals, 10 indicates generally a refrigerated box incorporating the principles of the present invention. Broadly, the refrigerated box 10 includes a foodstuffs cabinet 12 incorporating as the inner walls evaporator panels 14, a mechanism housing or casing 16 below and to which the foodstuffs cabinet is secured by any suitable desired means, as nuts and bolts (not shown), or the like, and a compressor-condenser unit 18 of any small standard make disposed within the mechanism casing 16. Rollers 20 may be provided.

The foodstuffs cabinet 12, in addition to the evaporator panels 14 which define a chamber 22, includes an inwardly sloping top wall 24 of fiber glass or other suitable material, four vertical side walls 26, four sloping walls or panels 28, an exterior bottom wall 30, an interior bottom wall 32, and insulation 34. Any desired securing means may be employed for holding the several component parts of the refrigeration cabinet together.

It is to be understood that the refrigeration mechanism, including the compressor and condenser unit 18, and the evaporator panels 14, operate in the well-known manner of such mechanisms, maintaining a desired low temperature within the chamber 22.

It is manifest from Figures 1–3 of the drawing that the housing 16 is of a size to fit readily within the chamber 22 with the external sloping walls 28 resting upon the top walls 24, so that a nesting relation exists between two or more refrigeration boxes 10. Hence, for transportation or storage purposes, the over-all required space is reduced to a multiple of the foodstuffs refrigeration cabinet 12 plus one housing 16. The boxes 10 are sufficiently sturdy to permit several to be stacked in a nesting group. The complementary sloping surfaces permit maximum nesting effects without sacrificing the advantage inherent in the regular sloping tops of open display refrigeration cabinets.

It is manifest that there has been provided a portable nesting refrigeration box which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a portable nesting refrigerating box comprising a display refrigeration cabinet having an open compartment for foodstuffs, said cabinet having side walls of substantial thickness having insulation between the inner and outer panels thereof, said cabinet having inwardly sloping top wall panels and similarly sloping exterior lower panels, and a mechanism casing beneath said cabinet for housing a compressor-condenser unit, said casing being of a cross section to fit within the cabinet compartment of a similar refrigerating box, said sloping exterior lower panels being formed to rest on the inwardly sloping top wall panels of a similar refrigerating box.

2. In combination, a portable nesting refrigerating box comprising a display refrigeration cabinet having an open compartment for foodstuffs, evaporator panels defining the side walls of said compartment, said cabinet having top wall panels extending generally outwardly from the upper end of said evaporator panels and having complementary inwardly extending exterior lower panels, a mechanism casing beneath said cabinet for housing a compressor-condenser unit, and a compressor-condenser unit within said casing, said casing being of a cross section to fit within the cabinet compartment of a similar refrigerating box, said exterior lower panels of one refrigerating box being formed to rest on the complementary top wall panels of a similar refrigerating box.

3. In a portable frozen food display box, a casing for housing a compressor-condenser unit, a cabinet surmounting said casing and defining an open-topped frozen food display compartment having internal volumetric dimensions exceeding the corresponding external volumetric dimensions of said casing, said cabinet having insulated side walls of substantial overall thickness terminating at the upper end in a laterally extending top wall panel and at the lower end in a complementary laterally extending bottom exterior panel, whereby a plurality of similar display boxes may be nested one within another so as to occupy a space corresponding to the number of cabinets plus only one casing.

4. The arrangement of claim 3 wherein a compressor-condenser unit is incorporated within the casing and an evaporating unit is incorporated in the side walls of the cabinet.

5. The arrangement of claim 3 wherein the laterally extending top and bottom panels have a downward slope from outside to inside, so as to provide added stability of nesting.

References Cited in the file of this patent

UNITED STATES PATENTS

| | | |
|---|---|---|
| 1,650,520 | Johnson | Nov. 22, 1927 |
| 2,447,022 | McCarl | Aug. 17, 1948 |
| 2,536,287 | Higgins | Jan. 2, 1951 |
| 2,663,158 | Sanders | Dec. 22, 1953 |

FOREIGN PATENTS

| | | |
|---|---|---|
| 134,201 | Austria | July 25, 1933 |